United States Patent [19]

Sonntag

[11] Patent Number: 4,974,755
[45] Date of Patent: Dec. 4, 1990

[54] DISPENSING VALVE ASSEMBLY AND SYSTEM

[75] Inventor: Donald W. Sonntag, Aurora, Colo.

[73] Assignee: Reagent Chemical & Research, Inc., Middlesex, N.J.

[21] Appl. No.: 341,636

[22] Filed: Apr. 20, 1989

[51] Int. Cl.⁵ .............................................. B67D 5/08
[52] U.S. Cl. .................................. 222/309; 222/334; 222/365; 222/438; 222/451; 137/246.23; 137/625.27; 141/258; 251/319
[58] Field of Search ............... 222/306, 108, 309, 380, 222/440, 438, 451, 148, 354, 444, 366, 453, 559, 571, 365, 64; 141/258, 260, 261; 251/319, 324, 63.5; 137/625.27, 246.23

[56] References Cited

U.S. PATENT DOCUMENTS

| | | |
|---|---|---|
| 2,649,996 | 8/1953 | Harrington . |
| 2,928,574 | 3/1960 | Wagner . |
| 3,132,775 | 5/1964 | Trumbull et al. . |
| 3,146,913 | 9/1964 | Nagai . |
| 3,189,233 | 6/1965 | Wilson ................................ 222/440 |
| 3,349,973 | 10/1967 | Smith ............................... 222/365 X |
| 3,666,147 | 5/1972 | Shiraki et al. ................... 222/440 X |
| 3,717,284 | 2/1973 | Garrard . |
| 3,731,716 | 5/1973 | Darish . |
| 3,865,281 | 2/1975 | Byrd et al. ....................... 222/309 X |
| 3,985,268 | 10/1976 | Wood . |
| 4,006,847 | 2/1977 | Dooley ............................ 222/309 X |
| 4,036,467 | 7/1977 | Dalton ............................ 251/319 X |
| 4,220,253 | 9/1980 | Gruenewald . |
| 4,293,010 | 10/1981 | Winiasz ........................... 222/309 X |
| 4,317,469 | 3/1982 | Pauliukonis ................. 137/625.27 X |
| 4,437,498 | 3/1984 | Pankratz et al. ................. 141/258 X |
| 4,566,612 | 1/1986 | von Kreuter ......................... 222/309 |
| 4,767,031 | 8/1988 | Proepper ......................... 141/261 X |

FOREIGN PATENT DOCUMENTS

| | | | |
|---|---|---|---|
| 331648 | 7/1958 | Switzerland ................... 137/625.27 |
| 2200616 | 8/1988 | United Kingdom ................ 222/444 |

Primary Examiner—Kevin P. Shaver
Assistant Examiner—Gregory L. Huson
Attorney, Agent, or Firm—Timothy J. Martin

[57] ABSTRACT

A dispensing valve assembly and system for viscous materials includes a dispensing valve including a valve casing with an interior chamber, a dispensing port and a longitudinal valve passageway. An inlet port intersects the valve passageay and connects to a source of material to be dispensed. A valve element is slidably received in the passageway and includes a drive shaft portion, an elongated piston head portion and a waisted portion. Seals are provided to seal against the piston head, and the valve element reciprocates over a cycle so that the waisted portion periodically interrupts the first seal allowing material to flow into the chamber and out of the dispensing port. As the valve element closes, a seal is again established to shut off material flow. Continued advancement retracts the piston head further from the chamber to create a negative pressure that draws back material from the dispensing portion to cause a clean cut off of flow. A metering port and a metering cylinder may be employed.

26 Claims, 6 Drawing Sheets

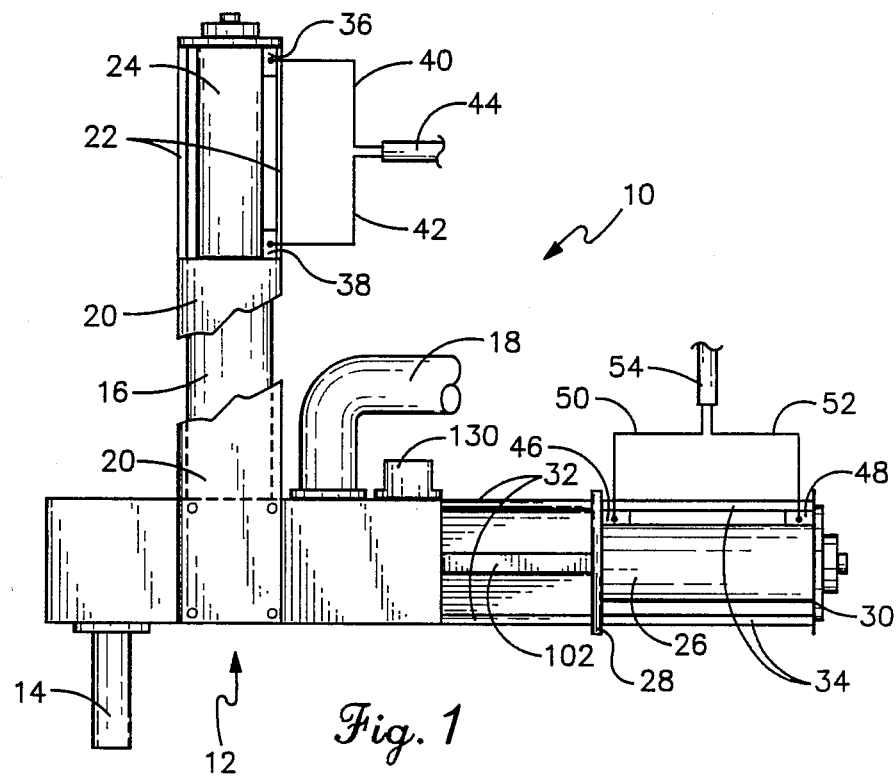
Fig. 1
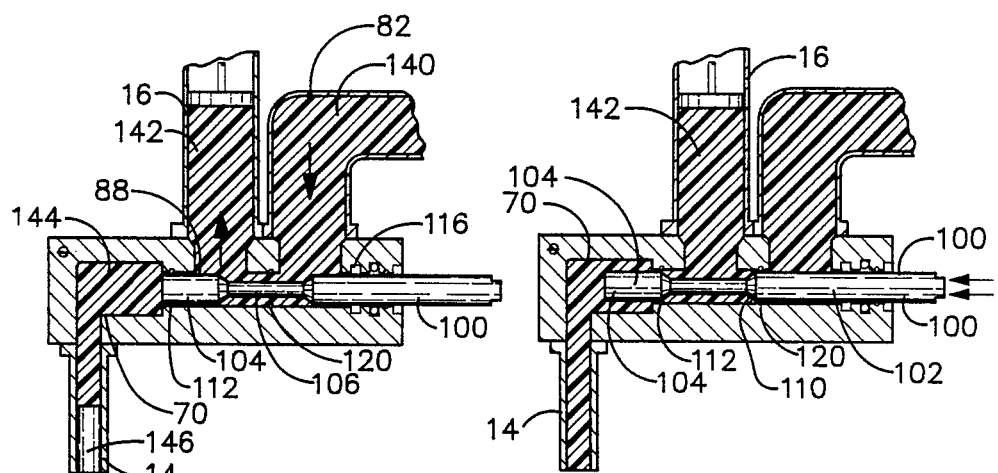
Fig. 4a
Fig. 4b

DISPENSING VALVE ASSEMBLY AND SYSTEM

FIELD OF INVENTION

The present invention relates generally to the field of dispensing valves which are adapted to dispense a preselected quantity of material. More specifically, however, the present invention is employed in the field of dispensing metered quantities of viscous materials. As such, the present invention may, for example and not limitation, be utilized in such diverse industries as food packaging, cosmetics and industrial and consumer chemicals.

BACKGROUND OF THE INVENTION

The advent of modern production facilities mandated the development of various valve apparatus susceptible to incorporation into mechanized and automatic equipment. Accordingly, there has been substantial development of a wide variety of valves, valve apparatus and systems which may be employed in automated processing equipment to dispense metered quantities of materials, among which are included solid, liquid and even gaseous materials. One of the more difficult problems facing the dispensing industry has been and remains the metered dispensing of viscous materials. These materials, while flowable, are difficult to handle. A particular problem resides in the dispensing of viscous materials since, due to their relatively high surface tension, the materials tend to cling together and to the dispensing equipment with which they are associated.

Examples of viscous materials for which accurate dispensing has value may be found in the food industry and include such viscous products as butter, peanut butter, jellies, cheeses, to name a few. In the cosmetic industry, these viscous materials may include thick lotions, gels, creams and the like. Household chemicals include such diverse products as shoe polish, greases, hand cleaners, and industrial chemicals include greases and other petroleum products, sealants, adhesives, and a host of others. All of these industries experience difficulties with automated packaging equipment, and the present invention is directed to providing improved dispensing techniques.

There has been in the past a reasonable degree of development of dispensing valves, apparatus and systems for dispensing viscous materials, of the types noted above. One example of a metering valve apparatus used in the food industry is shown in U.S. Pat. No. 2,649,996 issued 25 Aug. 1953 to Harrington. Here, a dual dispensing valve system employs specially constructed piston heads as part of the valve structure to produce a section at the end of respective dispensing nozzles so that material clinging to the end of the nozzle is drawn back into the valve or discharge conduit. Other examples of valve systems in the food industry which utilize the "snuffback" feature to reduce spillage or dripping are shown in U.S. Pat. No. 3,731,716 issued 8 May 1973 to Darish and U.S. Pat. No. 3,717,284 issued 20 Feb. 1973 to Gerrard.

Despite the improvements in technology represented by these structures, there remains a need for improved valves, apparatus and systems incorporating a "snuffback" feature. There is a further need for efficient, simplified valve structures which are simplified in configuration and are thus relatively low in cost to manufacture, economical to maintain, and durable in use.

SUMMARY OF THE INVENTION

It is an object of the present invention to provide a new and useful valve, valve assembly and dispensing system associated therewith wherein a snuff-back valve is constructed in a simplified manner.

Another object of the present invention is to provide a snuff-back valve and apparatus which is highly reliable and durable in use.

Yet another object of the present invention is to provide a snuff-back valve and apparatus that is relatively inexpensive to manufacture and maintain.

A still further object of the present invention is to provide a dispensing valve for viscous materials which is relatively accurate in dispensing a selected quantity of material and which reduces spillage, drippage and the like.

Yet another object of the present invention is to provide a snuff-back valve and valve assembly which may be incorporated in to an automated dispensing system without the need for complex control systems.

According to the present invention, then, a dispensing valve connectable to a source of viscous material is provided in order to dispense a selected quantity of the viscous material. In this broad form, the dispensing valve includes a valve casing which has an interior chamber, a dispensing port in communication with the chamber, a longitudinal valve passageway communicating with the chamber and an inlet port extending from an exterior inlet opening in the valve casing to an interior inlet opening communicating with the valve passageway to define a flowpath for the material to be dispensed. The valve passageway has a first opening in communication with the chamber and a second opening at the exterior of the valve casing. The valve element is slideably mounted in the valve passageway for reciprocal longitudinal movement therein between a fully open position and a fully closed position. The valve element includes a drive shaft portion, an elongated piston head portion, and a waisted portion interconnecting the drive shaft portion and the piston head portion. The drive shaft portion extends through the second opening of the longitudinal valve passageway to connect to a drive means that reciprocally drives the valve element between the open and closed positions.

The waisted portion of the valve element has a longitudinal length greater than the longitudinal distance between the inlet port and the first opening. A first sealing means is located between the interior inlet opening and the inlet port for sealing against the piston head portion during reciprocal movement thereof, and a second sealing means is located between the interior inlet opening and the second opening for sealing against the drive shaft portion during reciprocal movement thereof. The valve element is operative over a cycle of reciprocal movement to dispense material by advancing the piston head portion into the chamber whereby the seal between the valve element and the first sealing means is broken by the waisted portion so that the material may flow through the flow path alongside the waisted portion into the chamber after which it may be dispensed from the dispensing port. As the piston head portion is retracted from the chamber, it seats against the first sealing means to stop the flow of material, and continued retraction of the piston head creates a negative pressure whereby material in the dispensing port is drawn or "snuffed" back toward the chamber.

Preferably, the valve passageway is cylindrical in shape, and the valve element is preferably formed out of a cylindrical rod. Opposite ends of the waisted portion may be frusto-conical to help facilitate passage of the waisted portion edges past the sealing means, one of which is preferably an O-ring and the other of which is a ploypak seal mounted in circumferential grooves around the valve passageway. An elongated nozzle may be associated with the dispensing port and the interior of the nozzle has a cross-section that is less than or equal to the cross-sectional area of the piston head portion. The metering cylinder may be provided in communication with the exterior inlet opening so that it is in switchable communication with the source of material.

Preferably, the present invention does include a metering cylinder and, to this end, the valve casing has a metering port extending from an exterior metering opening to an interior metering opening, with the metering port being located between the first opening and the inlet port. The metering cylinder has an inlet/outlet opening in communication with the metering port exterior opening so that, as the valve element slides by the metering port, viscous material from the source flows into the metering cylinder after which advancement of the valve element seals off the source so that the metering cylinder contains an accurate measured quantity of material. Continued advancement of the valve element then opens the metering cylinder to the chamber and the metering cylinder discharges its contents into the chamber to be dispensed out of the dispensing port. A third seal, preferably in the form of an O-ring, is located between the interior inlet opening and the interior metering opening for sealing against the drive shaft portion during reciprocal movement. A lubricating and cleaning end seal structure is also provided. The valve casing is preferably constructed as a plurality of connected sections including a main body section, a chamber section and a shaft guide section, and the shaft guide section may itself be separated into separable portions including an inlet portion having the inlet port and a head portion having a second opening.

The valve described above with respect to the preferred embodiment may be incorporated into a dispensing apparatus including a first drive means connected to the drive shaft for reciprocally driving the drive element and a second drive means associated with the metering cylinder for driving a metering cylinder piston therethrough to discharge a selected quantity of material through the metering port. The first and second drive means may be air cylinders responsive to pressurized air to reciprocate their respective valve elements and metering cylinder piston head. Sensors may be provided with respect to each of the air cylinders to monitor the respective position of each, and a control unit operates an air valve that is connected to a pressurized air source. The control unit switches the pressurized air to the first and second air cylinders to control operation of the dispensing valve. A material reservoir may be interposed between the source of material and the dispensing valve, and the level of material in the reservoir may be automatically controlled by the control unit.

These and other objects of the present invention will become more readily appreciated and understood from a consideration of the following detailed description of the preferred embodiment when taken together with the accompanying drawing, in which:

BRIEF DESCRIPTION OF THE DRAWINGS

FIG. 1 is a side view in elevation showing the dispensing valve and valve assembly according to the preferred embodiment of the present invention;

FIGS. 4a-4f are side views in cross-section showing the dispensing valve according to the present invention progressively moving through one dispensing cycle;

DETAILED DESCRIPTION OF THE INVENTION

The present invention relates to valve apparatus and systems and in particular to dispensing valves adapted for dispensing a metered amount of viscous material. Accordingly, the present invention is described in detail with respect to the metering of a select amount of viscous material; however, it should be understood that the principles of the present invention have a broader application than the viscous materials, and the ordinarily skilled person in this field of invention may foresee extensions of the technology taught herein.

Figure 2:
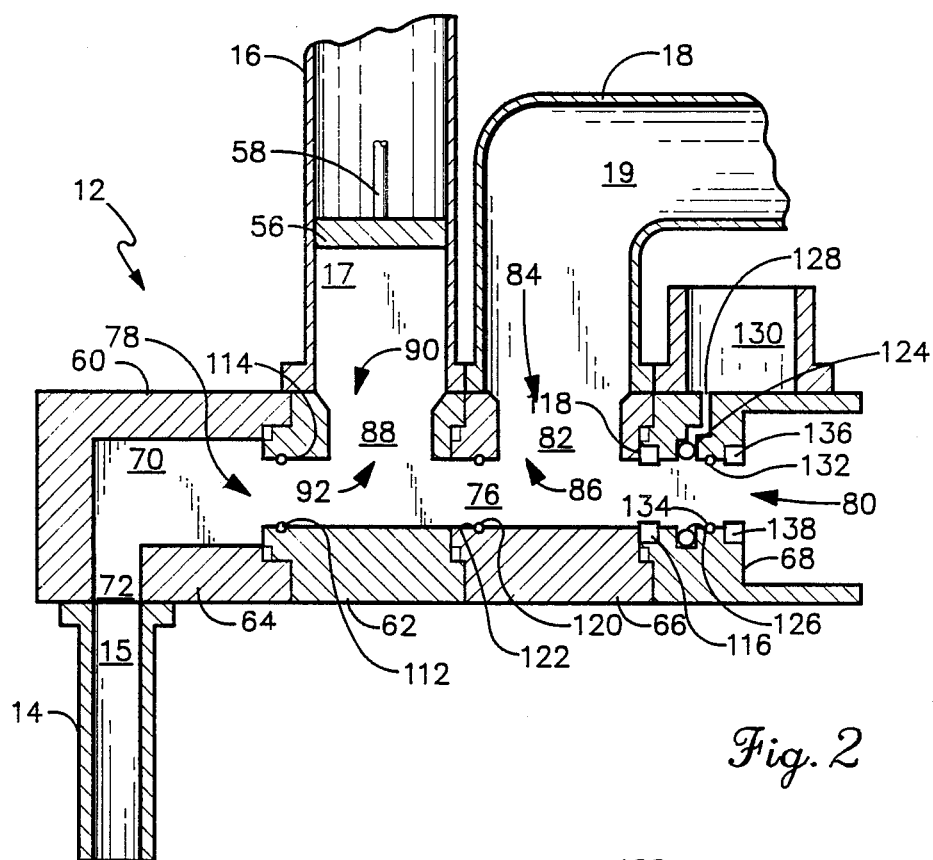
FIG. 2 is a side view in cross-section showing the valve casing and related components of the dispensing valve according to the preferred embodiment of the present invention.
Figure 3:
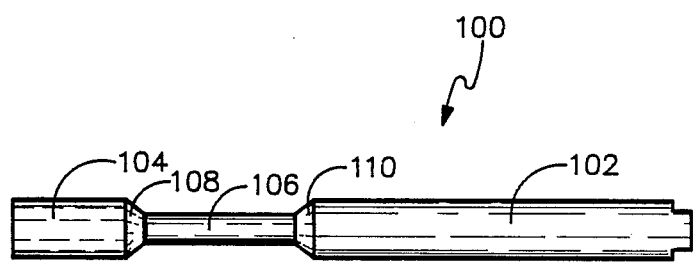
FIG. 3 is a side view in elevation of the valve element according to the preferred embodiment of the present invention.

With respect to the preferred embodiment of the present invention, the structure thereof is best shown in FIGS. 1-3. In FIG. 1, it may be seen that valve assembly 10 broadly includes a dispensing valve 12, a discharge nozzle 14 and a metering cylinder 16. An inlet conduit 18 may be in communication to a source of material to be dispensed and is connected to dispensing valve 12 as described more thoroughly below. Nozzle 14 has an interior 15 defining a discharge passageway for material to be dispensed.

Metering cylinder 16 is mounted to dispensing valve 12 between a pair of mounting plates, such as mounting plate 20, and mounting plate 20 further supports a plurality of support rods 22 which mount an air cylinder 24. Dispensing valve 12 includes a valve element described more thoroughly below but which valve element includes a drive shaft 102 which is connected to a second air cylinder 26 that is supported between mounting plates 28 and 30 respectively mounted by support rods 32 and 34. Air cylinder 24 has a pair of position sensors 36 and 38 which are connected respectively to wires 40 and 42 that define cable 44. Likewise, air cylinder 26 has a pair of position sensors 46 and 48 respectively connected to wires 50 and 52 that define cable 54.

As is best shown in FIG. 2, dispensing valve 12 includes a valve body or casing which is formed as a plurality of casing pieces or sections secured to one another. More specifically, valve casing 60 is formed by a meter section 62, a nozzle section 64, an inlet section 66 and a rear or rear seal section 68. Meter section 62 forms a main body of the valve casing and mounts meter cylinder 16. Nozzle section 64 mounts nozzle 14 and has an internal chamber 70 which communicates with a dispensing port 72 that is in communication with nozzle 14. Nozzle section 64 is mounted on one side of main body section 62, and inlet section 66 is mounted on the opposite side of main body section 62. Inlet section 66 mounts conduit 18. Rear seal section 68 is mounted to inlet section 66 opposite meter section 62 and acts as a seal and guide for drive shaft 102, shown in FIG. 1.

A valve passageway 76 is formed longitudinally through meter section 62, inlet section 66 and rear seal section 68 of valve casing 60. Thus, valve passageway 76 has a first opening 78 which is in communication with chamber 70; valve passageway 76 has a second opening 80 which is opposite first opening 78 and communicates with the exterior of valve casing 60. Thus, it can be seen that valve casing 60 has an interior formed by chamber 70 and valve passageway 76.

An inlet port 82 is formed in inlet section 66 and extends transversely of valve passageway 76 between an exterior inlet opening 84 and an interior inlet opening 86. Inlet conduit 18 has an interior 19 which is in fluid communication with inlet port 82 when conduit 18 is mounted on dispensing valve 12, as is shown in FIG. 2. Similarly, a metering port 88 is formed through meter section 62 transversely to valve passageway 76 and is in communication with valve passageway 76. Metering port 88 extends from an exterior metering opening 90 to an interior metering opening 92, and metering port 88 is also in communication with interior 17 of metering cylinder 16. As may be seen in FIG. 2, metering cylinder 16 includes a metering piston 56 slideably mounted in interior 17 and connected to a piston rod 58 for mechanical movement thereof. Inlet port 82, valve passageway 76, chamber 70 and port dispensing 72 define a flow path for material to be dispensed from an upstream location at the exterior opening 84 to a downstream location at dispensing port 72.

Valve element 100 is best shown in FIG. 3 and includes a drive shaft portion 102, an elongated piston head portion 104 and a waisted portion 106, having a reduced cross-section. Waisted portion 106 interconnects drive shaft 102 and piston head 104. Preferably, valve passageway 76 is cylindrical in shape so that it has a circular cross-section, and valve element 100 is formed out of a cylindrical rod that is milled for close fitting sliding reciprocal movement in valve passageway 76. Further, as may be seen in FIG. 3, waisted portion 106 opposite ends 108 and 110 having a frusto-conical shape.

With reference to FIG. 2, it may now be seen that a first sealing means, in the form of an O-ring 112, is mounted in a circumferential groove 114 extending around the interior of valve passageway 76 proximate first opening 78. A second sealing means in the form of a polypak seal 116 is mounted in a circumferential channel 118 formed in the surrounding sidewall of valve passageway 76 proximate second opening 80. Finally, a third sealing means in the form of O-ring 120 is mounted in a circumferential groove 122 formed in the surrounding sidewall of passageway 76 between interior inlet opening 86 and interior metering opening 92.

In order to lubricate and clean drive shaft 102 during use with a viscous material, a wick 124, preferably constructed of a felt material, is mounted in a circumferential groove 126 and is in fluid communication through port 128 with a reservoir 130 of cleaner/lubricant selected to be compatible with the material to be dispensed. O-ring seal 132 is mounted in circumferential groove 134 to retain the cleaner/lubricant between seal 116 and seal 132, and to prevent ingress of unwanted containments. Finally, a rod wiper 136 is mounted in an exterior groove 138 formed in rear section 68 in order to clean drive shaft 102.

The operation of valve assembly 10, including dispensing valve 12, may now best be shown with references to FIGS. 4a-4f. As is shown in these figures, dispensing valve 12 is movable between a fully closed position (FIGS. 4a and 4f) and a fully open position shown in FIG. 4c. To this end, as is shown in FIGS. 4a-4f, valve element 100 is slideably mounted in valve passageway 76 for reciprocal longitudinal movement therein between the fully open position and the fully closed position.

As is shown in FIG. 4a, it may be seen that valve element 100 is sealed by first seal 112 and by second seal 116. However, since waisted portion 106 has a greater longitudinal length than the longitudinal distance between ports 82 and 88, viscous material 140 may flow past seal 120 alongside waisted portion 106. Thus, material 140 flows into metering cylinder 16 as a selected measured quantity 142. It may be seen that an undispensed portion 144 of material is located in chamber 70 and partially in nozzle 14, leaving a void 146.

When metering cylinder 16 is filled with the selected amount, valve element 100 advances to the position shown in FIG. 4b. Frusto-conical portion 110 facilitates movement of valve element 100 past third seal 120 so that drive shaft 102 is sealed against valve casing 60. Similarly, piston head 104 advances into chamber 70 but remains sealed against first seal 112 since waisted portion 106 has a longitudinal length less than the distance between sealed 112 and 120. Both piston head 104 and drive shaft 102 are sealed, and metered material 142 cannot exit metering cylinder 16. However, due to the displacement of material in chamber 70 by piston head 104, the undispensed portion 144 of material is displaced by piston head 104 so that it fills former void 146 in nozzle 14.

Figure 4C:
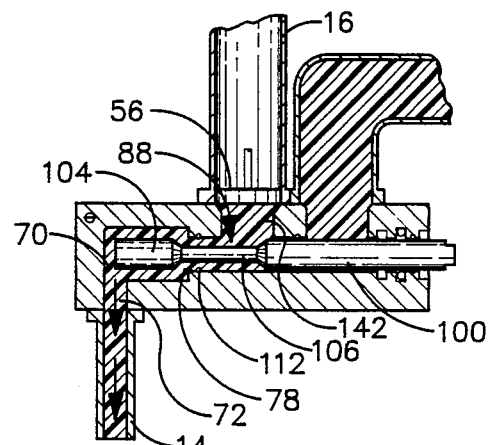

Valve element 100 continues to advance to the fully open position shown in FIG. 4c wherein piston head 104 moves out of a sealed relationship with seal 112. The metered material 142 is forced by metering piston 56 out of metering cylinder 16 so that the selected quantity of metered material is dispensed through dispensing port 70 and nozzle 14. It should be appreciated that this is accomplished since waisted portion 106 has a longitudinal length greater than the distance between metering port 88 and first opening 78. This allows metered material 142 to flow out of metering port 88 through valve passageway 76 alongside waisted portion 106, into chamber 70 and out of dispensing port 72.

Figure 4D:
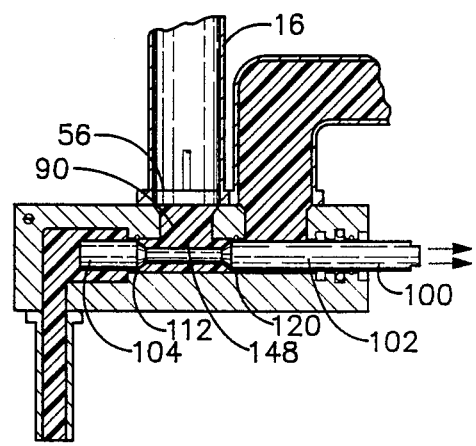
Figure 4E:
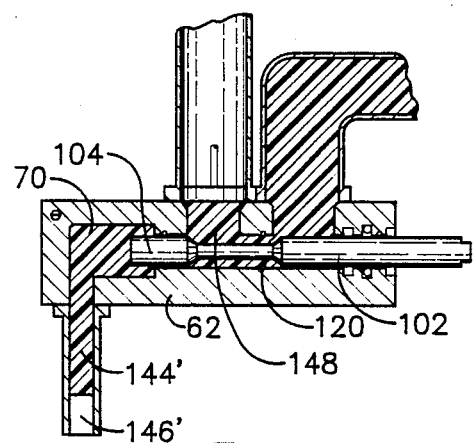
Figure 4F:
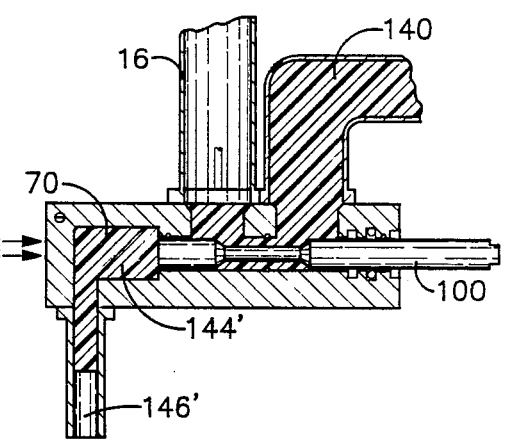

In the return or retracted path, as is shown in FIGS. 4d-4f, valve element 100 again moves into a position so that piston head 104 and drive shaft 102 are respectively sealed by first seal 112 and third seal 120. This position is identical to that shown in FIG. 4b except that the metered material has been discharged from metering cylinder 16 so that metering piston 56 is located proximate exterior metering opening 90. As valve element 100 continues to retract, to the position shown in FIG. 4e, piston head 104 begins to create a negative pressure in chamber 80 so that the undispensed portion 144' is drawn back toward or "snuffed back" into chamber 70 leaving a partial void 146'. Prior to the unseating of drive shaft 102 from third seal 120, the volume of the remaining material 148 in metering section 62 is unchanged due to the common cross-section of piston head 104 and drive shaft 102.

As is shown in FIG. 4f, valve element 100 continues to retract until it reaches the fully closed position, similar to FIG. 4a, except that in FIG. 4f, viscous material 140 is shown in a position to begin filling metering cylinder 16. In the position shown in FIG. 4f, it is important to note that the undispensed portion 144' has been drawn back into chamber 70 so that void 146' is created. From this description, it may be appreciated that the volume of voids 146 and 146' are each equal to the volume of piston head 104 that is removed from chamber 80 after piston head 104 seals against first seal 112. This withdrawal of material from nozzle 14 helps prevent unwanted drips or spillage as it provides both a clean cut-off for the undispensed material and accurate measurement of dispense material. To this end, it is desirable that the cross-sectional area of piston head 104 be equal to or greater than the cross-sectional area of both dispensing port 70 and interior 15 of nozzle 14.

Figure 5:
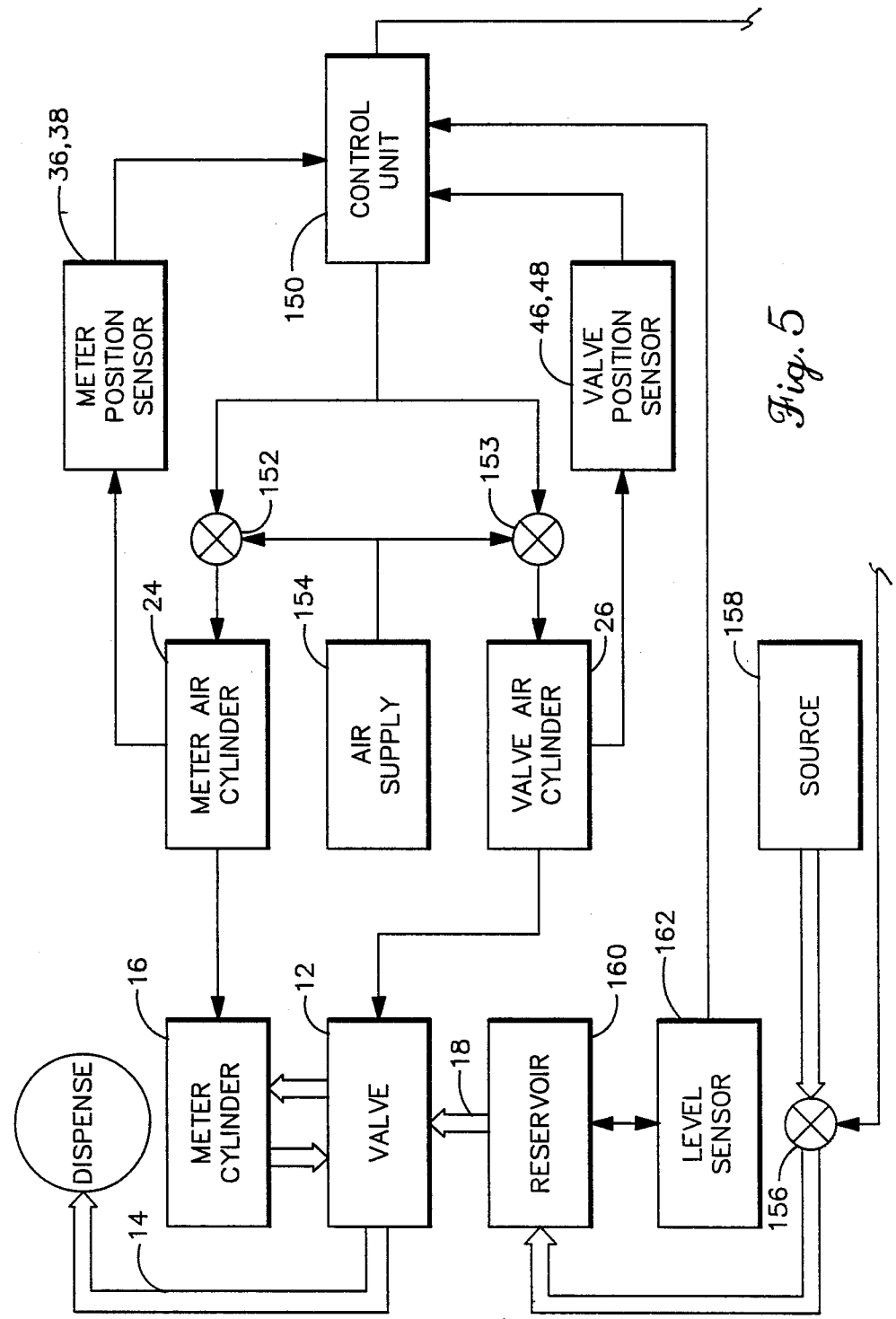
FIG. 5 is a flow diagram showing the dispensing valve system according to the present invention.

FIG. 5 shows a diagrammatic view of the dispensing apparatus and system according to the preferred embodiment of the present invention. Here, it may be seen that a control unit 150, such as a microprocessor, controls a material valve 156 so as to control a supply of material from source 158 to reservoir 160. To this end, reservoir 160 has a level sensor 162 which provides a signal to control unit 150 as to the amount of material in reservoir 160 so that control unit 150 can open and close valve 156 to supply material to reservoir 160 so that it stays within prescribed boundary limits. Reservoir 160 is then connected to conduit 18 that supplies the source of material to valve 12.

Similarly, control unit 150 controls a pair of three-way air valves 152 and 153 so that pressurized air from a pressurized air supply 154 is selectively provided through appropriate conduits to meter air cylinder 24 and valve air cylinder 26. To this end, control unit 150 monitors the position of air cylinders 24 and 26, respectively, through position sensors 36, 38 and sensors 46, 48. Control unit 150 then operates valves 152 and 153 so that pressurized air to valve air cylinder 26 reciprocates valve element 100 and and so that pressurized air to air cylinder 24 reciprocates meter piston 56.

Figure 6:
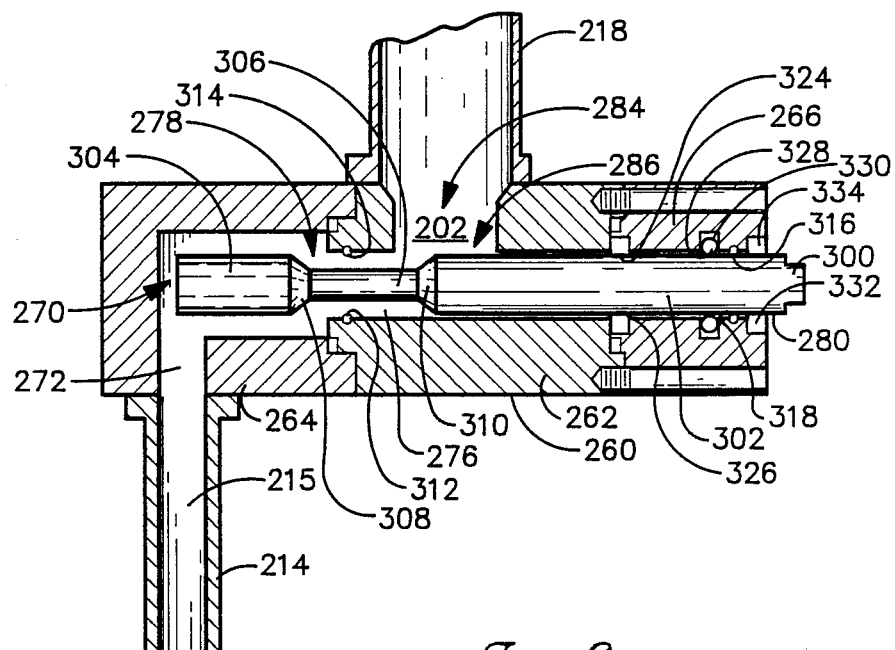
FIG. 6 is a side view in cross-section showing a simplified embodiment of the valve assembly of the present invention.

A simplified version of the present invention eliminating metering cylinder 16 is shown as an alternate embodiment in FIGS. 6 and 7a-c. As is shown in FIG. 6, a dispensing valve 212 is formed as a valve casing 260, with valve casing 260 including an inlet section 262, a nozzle section 264 and a rear guide section 266. Nozzle section 264 has an internal chamber 270, and a dispensing port 272 extends through the side wall of nozzle section 270 and is in communication with the interior 215 of a nozzle element 214 attached to nozzle section 264. A longitudinal valve passageway 276 extends from a first opening 278 to a second opening 280 through inlet section 262 and rear section 266. An inlet passageway 282 extends transversely valve passageway 276 from an exterior inlet opening 284 to an interior inlet opening 286 at the intersection of port 282 and passageway 276. An inlet conduit 218 is secured to dispensing valve 212 in communication with inlet port 282 and is connected to a source of material to be dispensed by dispensing valve 212.

A valve element 300 is slideably positioned in valve passageway 276 and is mounted for reciprocal movement therein. As is shown in FIG. 6, the valve passageway 276 is preferably cylindrical in shape, and valve element 300 is formed out of a cylindrical rod. To this end, valve element 300 includes a drive shaft portion 302, an elongated piston head portion 304 and a waisted portion 306 that interconnects head portion 304 to drive shaft portion 302. Waisted portion 306 has opposite frusto conical ends 308 and 310. Valve element 300 may be reciprocally driven in any convenient manner, so such by air cylinders as described with respect to the preferred embodiment, above.

A first sealing means is located between inlet port 282 and first opening 278 and, as is shown in FIG. 6, comprises an O-ring 312 that is received in a circumferential groove 314 which extends around the side wall surface of passageway 276. A second sealing means, in the form of polypak seal 324 is mounted in a channel 326 extending circumferentially around valve passageway 276. In order to lubricate and clean drive shaft 302 as it reciprocates, a wick 328 is mounted in a groove 330 and is connected with a lubricate/cleaner reservoir (not shown) in a manner similar to that described above with respect to the preferred embodiment. A third seal in the form of O-ring 316 extends around a groove 318 proximate second opening 280 to retainer the cleaner/lubricate in the region between O-ring 316 and second seal 324. A rod wiper 332 is mounted in a circumferential channel 334 at opening 280 also in a manner similar to that described with respect to the preferred embodiment.

Figure 7A:
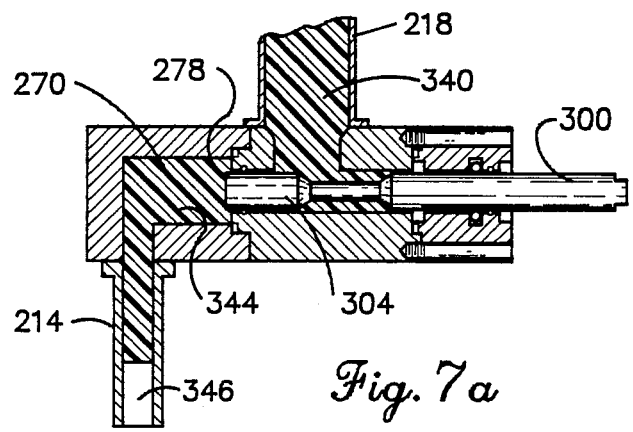
FIGS. 7a-7c are side views in cross-section showing the dispensing valve of FIG. 7 progressively moving through a dispensing cycle.
Figure 7B:
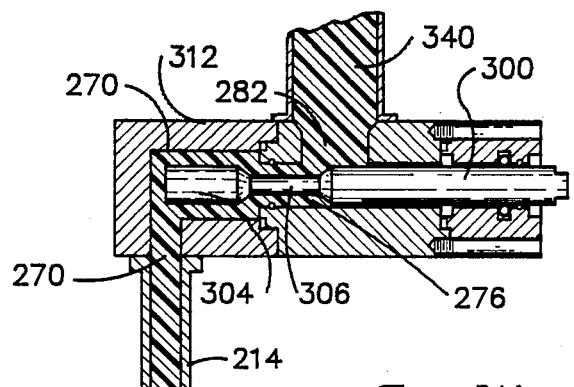
Figure 7C:
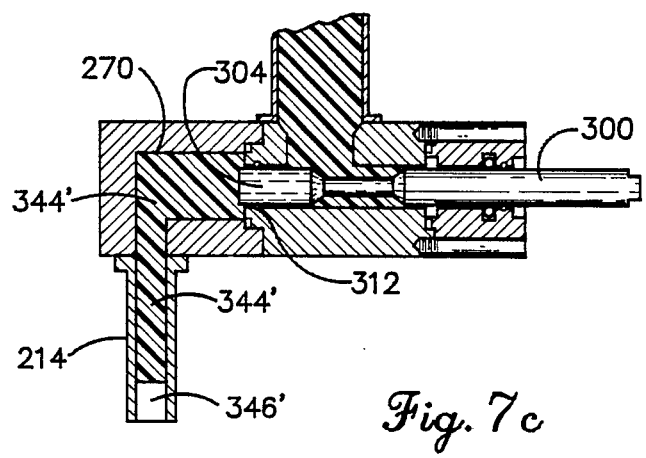

From the foregoing and with FIGS. 7a-7c, it may be seen that the alternate embodiment of the present invention allows the dispensing of material from a material source connected to inlet conduit 218. As is shown in FIG. 7a, representative of the start and finish of a dispensing cycle, valve element 300 is in a closed position with head portion 300 fully retracted from chamber 270. In this position, a portion of material 340 is located for dispensing in conduit 218, and is in position to be dispensed; an undispensed portion 344 is located in chamber 270 and partially fills nozzle 214. A material void 346 as resulting from retraction of head 304 from chamber 270 is located in nozzle 214 much in the manner described with respect to the preferred embodiment and as described below.

FIG. 7b shows dispensing valve 212 in the fully open position so that head portion 304 of valve element 300 is fully inserted into chamber 270. Waisted portion 306 is constructed so that it has a longitudinal length that is greater than the distance between seal 312 and inlet port 282 so that material 340 may flow through inlet port 282, through valve passageway 276 along side waisted portion 306 so that they pass through chamber 270 and be dispensed through nozzle 214.

After a selected interval of time, piston element 300 is retracted so that it first engages seal 312 to stop the flow of material and then continues to retract from chamber 270, as is shown in FIG. 7c. As piston head 304 continues to retract the undispensed material 344' is drawn back into nozzle 214 and chamber 270 creating a void 346'. Once again, this drawing back or "snuff back" of material 344' provides for a clean cutoff of the dispensed material to avoid dripping and the like.

In this embodiment of the present invention, though, it should be appreciated that the selected amount of material to be dispensed must be metered by controlling the length of time that dispensing valve 212 is open since no metering cylinder is provided. The amount of material dispensed, then, is depended upon flow rate of material and cross-section of nozzle 214, as is known in the art. This timed duration could be a set duration or could be automatically adjusted according to other techniques, such as by weighing the amount of dispensed material, to actuate the opening and closing of dispensing valve 212.

Accordingly, the present invention has been described with some degree of particularity directed to the preferred embodiment of the present invention. It should be appreciated, though, that the present invention is defined by the following claims construed in light of the prior art so that modifications or changes may be made to the preferred embodiment of the present invention without departing from the inventive concepts contained herein.

I claim:

1. A dispensing valve adapted to be connected to a source of viscous material and operatively driven to dispense a selected quantity of the viscous material, comprising:

a valve casing having an interior chamber, a dispensing port in communication with the chamber, a longitudinal valve passageway communicating with said chamber at a first opening and having a second opening opposite the first opening, and an inlet port extending from an exterior inlet opening in said valve casing to an interior inlet opening communicating with the valve passageway whereby a flow path for material to be dispensed is defined through said valve casing from an upstream location at the exterior inlet opening to a downstream location at the dispensing port, the inlet port adapted to be connected in fluid communication with the source of viscous material;

a valve element slideably mounted in the valve passageway for reciprocal longitudinal movement therein between a fully open position and a fully closed position, said valve element including a drive shaft portion, an elongated piston head having a piston head length and a waisted portion interconnecting the drive shaft portion and said piston head, said drive shaft portion connectable through the second opening to a drive means for reciprocally driving said valve element between the fully open and fully closed positions;

a first sealing means located between the inlet port and the first opening for sealing against said piston head during reciprocal movement thereof;

a second sealing means located between the inlet port and the second opening for sealing against said drive shaft portion during reciprocal movement thereof, said waisted portion having a longitudinal length greater than the longitudinal distance between the inlet port and the first sealing means; and said valve element operative during a cycle of said reciprocal movement from the fully closed position, through the fully open position and back to the fully closed position to dispense material by advancing said piston head into the chamber to the fully open position whereby the seal between the valve element and said first sealing means is interrupted by said waisted portion whereby material may flow through said flow path, alongside said waisted portion and into the chamber through the first opening after which said piston head is retracted to again seal against said first sealing means and then be withdrawn from the chamber until said valve element is in the fully closed position, whereby withdrawal of said piston head from the chamber is operative to create a negative pressure so that material in the dispensing port is drawn back toward the chamber.

2. A dispensing valve according to claim 1 wherein said piston head is cylindrical in shape and wherein said waisted portion has a first end proximate said piston head, said first end being frusto-conical in shape.

3. A dispensing valve according to claim 1 including a metering cylinder mounted in communication with said exterior inlet opening and means to enable switchable communication between said source of material and said metering cylinder whereby the amount of material flowing through the dispensing port is controllable.

4. A dispensing valve according to claim 1 wherein said valve casing is formed by an inlet section, a nozzle section having the chamber formed therein and mounted on one side of said main body section and rear guide section mount on another side of said inlet section opposite said nozzle section, said inlet section and said rear guide section having said valve passageway formed therein, said inlet section having the inlet port formed therein.

5. A dispensing valve according to claim 1 wherein said valve casing includes an elongated nozzle having a discharge passageway, said nozzle element mounted with the discharge passageway in fluid communication with said dispensing outlet.

6. A dispensing valve according to claim 5 wherein said discharge passageway has a cross-sectional area that is less than or equal to the cross-sectional area of said piston head.

7. A dispensing valve according to claim 1 wherein said valve passageway is cylindrical in shape and said valve element is formed as a cylindrical rod sized for close-fitting insertion in said valve passageway, said drive shaft portion and said piston head having a common circular cross-section.

8. A dispensing valve according to claim 7 wherein opposite ends of said waisted portion are frusto-conical in shape.

9. A dispensing valve according to claim 7 wherein said first sealing means includes a first O-ring and the second sealing means includes a polypak seal.

10. A dispensing valve according to claim 9 wherein said valve passageway has a first circumferential groove receiving and retaining the first O-ring defining said first sealing means and a second circumferential groove receiving and retaining polypak defining said second sealing means.

11. A dispensing valve according to claim 1 including cleaning/lubricating means proximate said second opening for removing any unwanted material from said drive shaft and for lubricating said drive shaft for reciprocal movement in valve passageway.

12. A dispensing valve according to claim 11 including cleaning/lubricating means proximate said second opening for removing any unwanted material from said drive shaft and for lubricating said drive shaft for reciprocal movement in valve passageway.

13. A dispensing valve according to claim 11 wherein said cleaning lubricating means includes a lubricant reservoir operative to receive a cleaning/lubricating fluid, an end sealing means proximate the second opening for sealing against said drive shaft, and a wick located between said end sealing means and said second sealing means, said valve casing including a lubrication port interconnecting said lubricant reservoir and said wick in fluid communication.

14. A dispensing valve according to claim 13 wherein said cleaning lubricating means includes a lubricant reservoir operative to receive a cleaning/lubricating fluid, an end sealing means proximate the second opening for sealing against said drive shaft, and a wick located between said end sealing means and said second sealing means, said valve casing including a lubrication port interconnecting said lubricant reservoir and said wick in fluid communication.

15. A dispensing valve assembly adapted to be connected in communication with a source of material to dispense a selected quantity thereof, comprising:

a valve casing having an interior chamber, a dispensing port in communication with the chamber, a longitudinal valve passageway communicating with the chamber at a first opening and having a second opening opposite the first opening, an inlet port extending from an exterior inlet opening in said valve casing to an interior inlet opening communicating with the valve passageway, and a metering port extending from an exterior metering opening to an interior metering opening communicating with the valve passageway whereby a flow path for material to be dispensed is defined through said valve casing from an upstream location at the exterior inlet opening to a downstream location at the dispensing port, the inlet port adapted to be connected in fluid communication with the source of material to be dispensed;

a metering cylinder in communication with the metering port whereby material may flow into and out of said metering cylinder;

a valve element slideably mounted in the valve passageway for reciprocal longitudinal movement therein between a fully open position and a fully closed position, said valve element including a drive shaft portion, a piston head portion having a piston head length and a waisted portion interconnecting the drive shaft and piston head portions, said drive shaft portion connectable through the second opening to a drive means for reciprocally driving said valve element between the fully open and fully closed positions;

a first sealing means located between the interior metering opening and the first opening for sealing against the piston head portion during reciprocal movement thereof to establish a first seal between the metering port and the chamber;

a second sealing means located between the inlet port and the second opening for sealing against said drive shaft portion during reciprocal movement thereof to establish a second seal between the second opening and the inlet port; and a third sealing means located between the inlet port and the metering port for sealing against said drive shaft portion during reciprocal movement thereof to establish a third seal between the metering port and the inlet port;

said waisted portion having a longitudinal length greater than a first longitudinal distance between the inlet port and the third sealing means and greater than a second longitudinal distance between the metering port and the first sealing means;

said valve element operative during a cycle of reciprocal movement from the fully closed position through the fully open position and back to the fully closed position to dispense material by first positioning said waisted portion in said valve passageway between the interior inlet opening and the interior metering opening to interrupt the third seal whereby the selected quantity of material flows from the source connected to the inlet port, alongside the waisted portion and into said metering cylinder, advancing the valve element so that the third seal is re-established, advancing the valve element to the fully open position whereby said waisted portion is positioned in the valve passageway between the interior metering opening and the first opening to interrupt the first seal whereby the selected quantity of material in said metering cylinder flows into the chamber and out of said dispensing port after which the valve element is retracted to again establish the first seal and continuing to retract said valve element until said valve element is in the fully closed position, such that retraction of the piston head portion away from the chamber after re-establishing the first seal creates a negative pressure whereby material in the dispensing port is drawn back toward the chamber.

16. A dispensing valve assembly according to claim 15 wherein said valve casing is constructed as a plurality of connected sections releasably secured to one another.

17. A dispensing valve assembly according to claim 16 wherein said valve casing includes a nozzle section containing the chamber, a metering section, an inlet section and a rear section, guide section, said metering section, said inlet section and said rear guide section forming the valve passageway.

18. A dispensing valve assembly according to claim 15 wherein the valve passageway is cylindrical in shape, said valve element being formed as a cylindrical rod with said piston head portion and said shaft portion sized to have a common circular cross-section for close-fitted insertion in the valve passageway.

19. A dispensing valve assembly according to claim 18 wherein said first and third sealing means include O-ring seals and said second sealing means includes a polypak seal.

20. A dispensing valve assembly according to claim 19 wherein said waisted portion has opposite frusto-conical ends operative to facilitate relative movement of the waisted portion, the piston movement of the waisted portion, the piston head portion and the drive shaft past each respective O-ring seal.

21. A dispensing valve assembly according to claim 18 including a nozzle mounted to said valve casing in communication with the dispensing port, said nozzle having an interior having a cross-sectional area the same as or smaller than the cross-sectional area of the piston head portion.

22. A dispensing valve assembly according to claim 21 wherein the dispensing port and the interior of said nozzle have a common cross-sectional area.

23. A dispensing apparatus connectable to a source of viscous material to be dispensed and operative to dispense a selected quantity of said material, comprising:

a metering cylinder having an interior operative to receive the selected quantity of said material and including a piston member for discharging the selected quantity of said material;

a valve assembly including a valve casing, a valve element, a first sealing means, a second sealing means and a third sealing means;

said valve casing having an interior chamber, a dispensing port in communication with the chamber, a longitudinal valve passageway communicating with the chamber at a first opening and having a second opening opposite the first opening, an inlet port extending from an exterior inlet opening in said valve casing to an interior inlet opening communicating with the valve passageway, and a metering port extending from an exterior metering opening to an interior metering opening communicating with the valve passageway whereby a flow path for material to be dispensed is defined through said valve casing from an upstream location at the exterior inlet opening to a downstream location at the dispensing port, the inlet port adapted to be connected in fluid communication with the source of material to be dispensed, said metering cylinder in communication with the metering port exterior opening whereby material may flow into and out of said metering cylinder;

said valve element slideably mounted in the valve passageway for reciprocal longitudinal movement therein between a fully open position and a fully closed position, said valve element including a drive shaft portion, a piston head portion having a piston head length and a waisted portion interconnecting the drive shaft and piston head portions;

said first sealing means located between the interior metering opening and first opening for sealing against the piston head portion during reciprocal movement thereof to establish a first seal between the metering port and the chamber;

said second sealing means located between the interior inlet opening and the second opening for sealing against said drive shaft portion during reciprocal movement thereof to establish a second seal between the second opening and the inlet port;

said third sealing means located between the interior inlet opening and the interior metering opening for sealing against said drive shaft portion during reciprocal movement thereof the establish a third seal between the metering port and the inlet port;

said waisted portion having a longitudinal length greater than a first longitudinal distance between the inlet port and the third sealing means and greater than a second longitudinal distance between the metering port and the first sealing means;

said valve element operative during a cycle of reciprocal movement from the fully closed position through the fully open position and back to the fully closed position to dispense material by first positioning said waisted portion in said valve passageway between the interior inlet opening and the interior metering opening to interrupt the third seal whereby the selected quantity of material flows from the source connected to the inlet port, alongside the waisted portion and into said metering cylinder, advancing the valve element so that the third seal is re-established, advancing the valve element to the fully open position whereby said waisted portion is positioned in the valve passageway between the interior metering opening and the first opening to interrupt the first seal whereby the selected quantity of material in said metering cylinder flows into the chamber and out of said dispensing port after which the valve element is retracted to again establish the first seal and continuing to retract said valve element until said valve element is in the fully closed position, such that retraction of the piston head portion away from the chamber after re-establishing the first seal creates a negative pressure whereby material in the dispensing port is drawn back toward the chamber;

a first drive means connected to said drive shaft for reciprocally driving said valve element between said fully open and fully closed position; and a second drive means associated with said metering cylinder for driving said piston therethrough to discharge the selected quantity of material through the metering port, into the chamber and out of the dispensing port.

24. Dispensing apparatus according to claim 23 wherein said first drive means is a first air cylinder responsive to pressurized air to reciprocate said valve element and said second drive means is a second air cylinder responsive to pressurized air to advance said metering cylinder piston to discharge the selected metered quantity of material therefrom.

25. Dispensing apparatus according to claim 24 including sensors associated with each of said first and second air cylinders to monitor the respective positions thereof, a pressurized air source, air valve means for switching pressurized air from said air source to said first and second air cylinders and control means responsive to said sensors to operate said air valve means.

26. Dispensing apparatus according to claim 25 including a material reservoir operative to receive viscous material from said source of viscous material and providing viscous material to the inlet port, level sensing means for sensing the level of material in said reservoir, and material valve means between said source of material and said reservoir for providing material to the reservoir from the source in an open position and isolating said reservoir from the source in as closed position, said control means responsive to said level sensing means to operate said material valve means.

* * * * *